(12) United States Patent
Dallarosa et al.

(10) Patent No.: US 10,821,552 B2
(45) Date of Patent: Nov. 3, 2020

(54) MODULAR LASER PROCESSING ENCLOSURE AND SYSTEM

(71) Applicant: IPG Photonics Corporation, Oxford, MA (US)

(72) Inventors: Joseph Dallarosa, Uxbridge, MA (US); Benjamin Amar, Worcester, MA (US); Mark Labbe, Dayville, CT (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 199 days.

(21) Appl. No.: 15/772,575

(22) PCT Filed: Nov. 3, 2016

(86) PCT No.: PCT/US2016/060282
§ 371 (c)(1),
(2) Date: May 1, 2018

(87) PCT Pub. No.: WO2017/079409
PCT Pub. Date: May 11, 2017

(65) Prior Publication Data
US 2019/0091806 A1    Mar. 28, 2019

Related U.S. Application Data

(60) Provisional application No. 62/252,033, filed on Nov. 6, 2015.

(51) Int. Cl.
*B23K 26/12* (2014.01)
*B23K 26/352* (2014.01)
(Continued)

(52) U.S. Cl.
CPC .......... *B23K 26/352* (2015.10); *B23K 26/123* (2013.01); *B23K 26/125* (2013.01);
(Continued)

(58) Field of Classification Search
CPC .. B23K 26/12; B23K 26/1224; B23K 26/123; B23K 26/125; B23K 26/127;
(Continued)

(56) References Cited

U.S. PATENT DOCUMENTS 5,090,288 A * 2/1992 Pelzer .................... B23Q 1/015
83/860
5,643,477 A   7/1997 Gullo et al.
(Continued)

OTHER PUBLICATIONS

International Preliminary Report on Patentability dated May 17, 2018 received in related International Application No. PCT/US2016/060282, 6pp.

*Primary Examiner* — Hung D Nguyen
(74) *Attorney, Agent, or Firm* — Grossman, Tucker, Perreault & Pfleger, PLLC

(57) ABSTRACT

A modular laser processing enclosure includes an enclosure housing defining a laser processing area. The enclosure housing includes a top defining a top laser processing access opening providing access to the laser processing area and at least two sides defining side laser processing access openings providing access to the laser processing area. The side laser processing access openings may be located proximate the top of the enclosure housing. The enclosure may further include at least one plate configured to cover any one of the laser processing access openings. Optionally, at least one laser processing head may be configured to be mounted to any one of the laser processing access openings and/or a least one part handling mechanism may be provided to access the laser processing area through any one of the laser processing access openings for delivering parts to and/or from the laser processing area.

23 Claims, 13 Drawing Sheets

(51) Int. Cl.
*B23K 26/34* (2014.01)
*B23K 26/382* (2014.01)
*B23K 26/21* (2014.01)
*B23K 26/38* (2014.01)
*B23K 37/047* (2006.01)
*B23K 26/02* (2014.01)

(52) U.S. Cl.
CPC ........ *B23K 26/127* (2013.01); *B23K 26/1224* (2015.10); *B23K 26/21* (2015.10); *B23K 26/34* (2013.01); *B23K 26/355* (2018.08); *B23K 26/38* (2013.01); *B23K 26/382* (2015.10); *B23K 37/047* (2013.01)

(58) Field of Classification Search
CPC .. B23K 26/128; B23K 26/142; B23K 26/146; B23K 26/21; B23K 26/34; B23K 26/352; B23K 26/355; B23K 26/36; B23K 26/38; B23K 26/382; B23K 37/047

USPC .............. 219/121.6, 121.63, 121.67, 121.68, 219/124.73, 121.82, 121.86
See application file for complete search history.

(56) References Cited

U.S. PATENT DOCUMENTS

| | | |
|---|---|---|
| 5,771,260 A | 6/1998 | Elliott et al. |
| 2007/0057412 A1* | 3/2007 | Weiskopf ............... B33Y 10/00 264/497 |
| 2008/0017620 A1* | 1/2008 | Sukhman ............... B23K 26/12 219/121.86 |
| 2011/0259862 A1 | 10/2011 | Scott et al. |
| 2013/0341313 A1* | 12/2013 | Himmelsbach ...... B23K 26/127 219/121.86 |
| 2015/0273641 A1* | 10/2015 | Mabee ................... B23Q 7/035 219/121.86 |

* cited by examiner

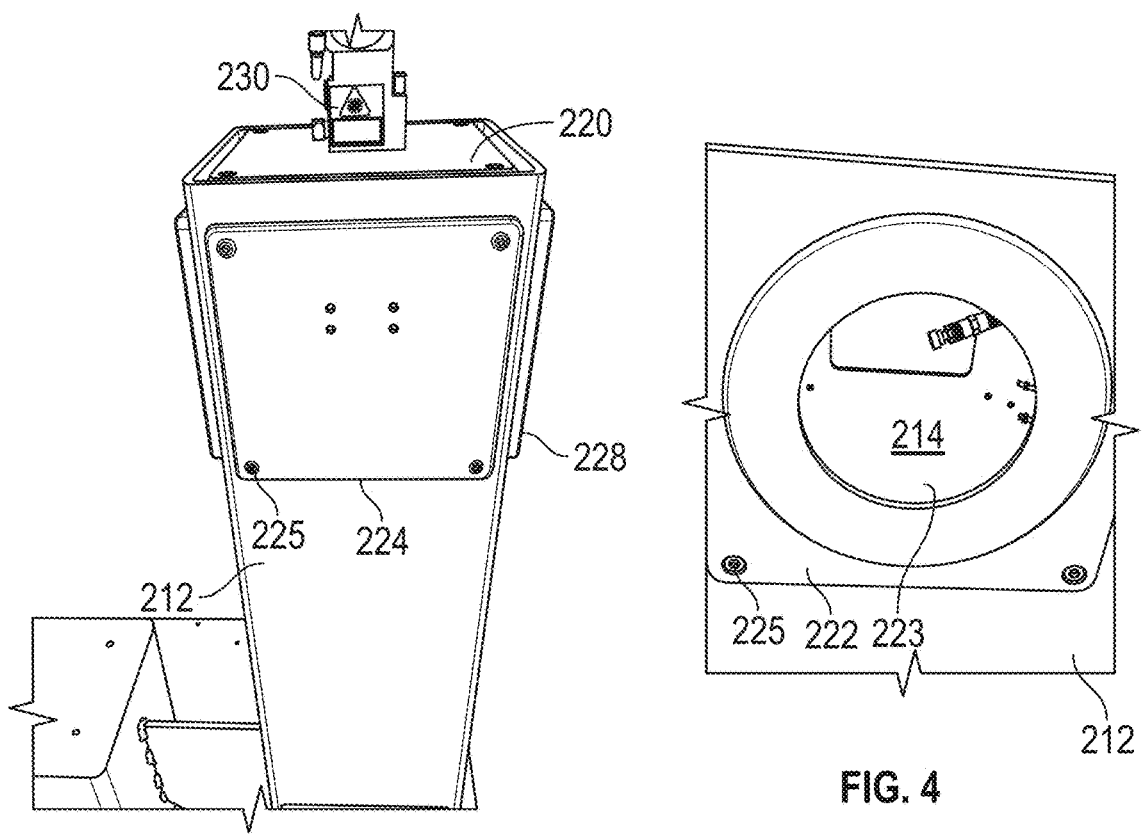
FIG. 3
FIG. 4
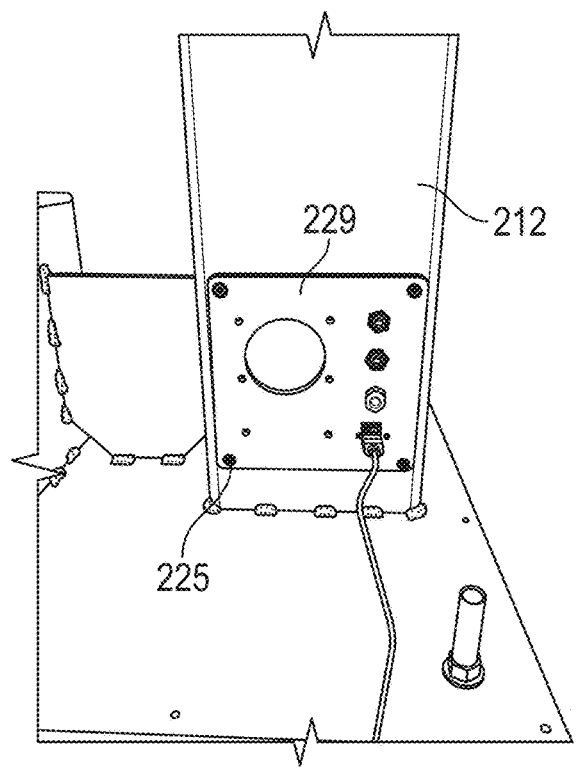
FIG. 5

MODULAR LASER PROCESSING ENCLOSURE AND SYSTEM

CROSS-REFERENCE TO RELATED APPLICATIONS

This application claims the benefit of U.S. Provisional Patent Application Ser. No. 62/252,033, filed on Nov. 6, 2015, which is fully incorporated herein by reference.

TECHNICAL FIELD

The present invention relates to laser processing systems and more particularly, to a modular processing system and enclosure.

BACKGROUND INFORMATION

Laser processing systems may be used for a variety of processing applications including, without limitation, marking, welding, cladding, cutting and drilling. Different processing applications often involve different types of lasers, laser processing heads, and part handling mechanisms. A laser processing system used for such applications may include an enclosure for enclosing the processing area to prevent user access during operation, for example, providing Class 1 laser safety. Such enclosures are often designed for a particular laser processing head and part handling mechanism and may thus limit the versatility of the laser processing system.

BRIEF DESCRIPTION OF THE DRAWINGS

These and other features and advantages will be better understood by reading the following detailed description, taken together with the drawings wherein:

FIG. 3 is a close-up side perspective view of a cover plate covering a laser processing access opening in an enclosure housing of the modular laser processing enclosure shown in FIG. 2A.

FIG. 4 is a close-up side perspective view of a part loading plate having an opening providing access to a laser processing area within the enclosure housing shown in FIG. 2A.

FIG. 5 is a close-up side view of a laser system connection plate on a lower side of the enclosure housing shown in FIG. 2.

DETAILED DESCRIPTION

A modular laser processing enclosure, consistent with embodiments of the present disclosure, is capable of being used with different laser processing heads and part handling mechanisms to form a modular laser processing system. The modular laser processing enclosure generally includes an enclosure housing defining a laser processing area and multiple laser processing access openings for accessing the laser processing area. The modular laser processing enclosure further includes one or more plates that may be removably mounted over the laser processing access openings to allow use with different laser processing heads and/or part handling mechanisms in different configurations for different applications. The modular laser processing system may be a Class 1 laser system for use with different applications including, without limitation, cutting, drilling, welding, cladding and marking.

Figure 1:
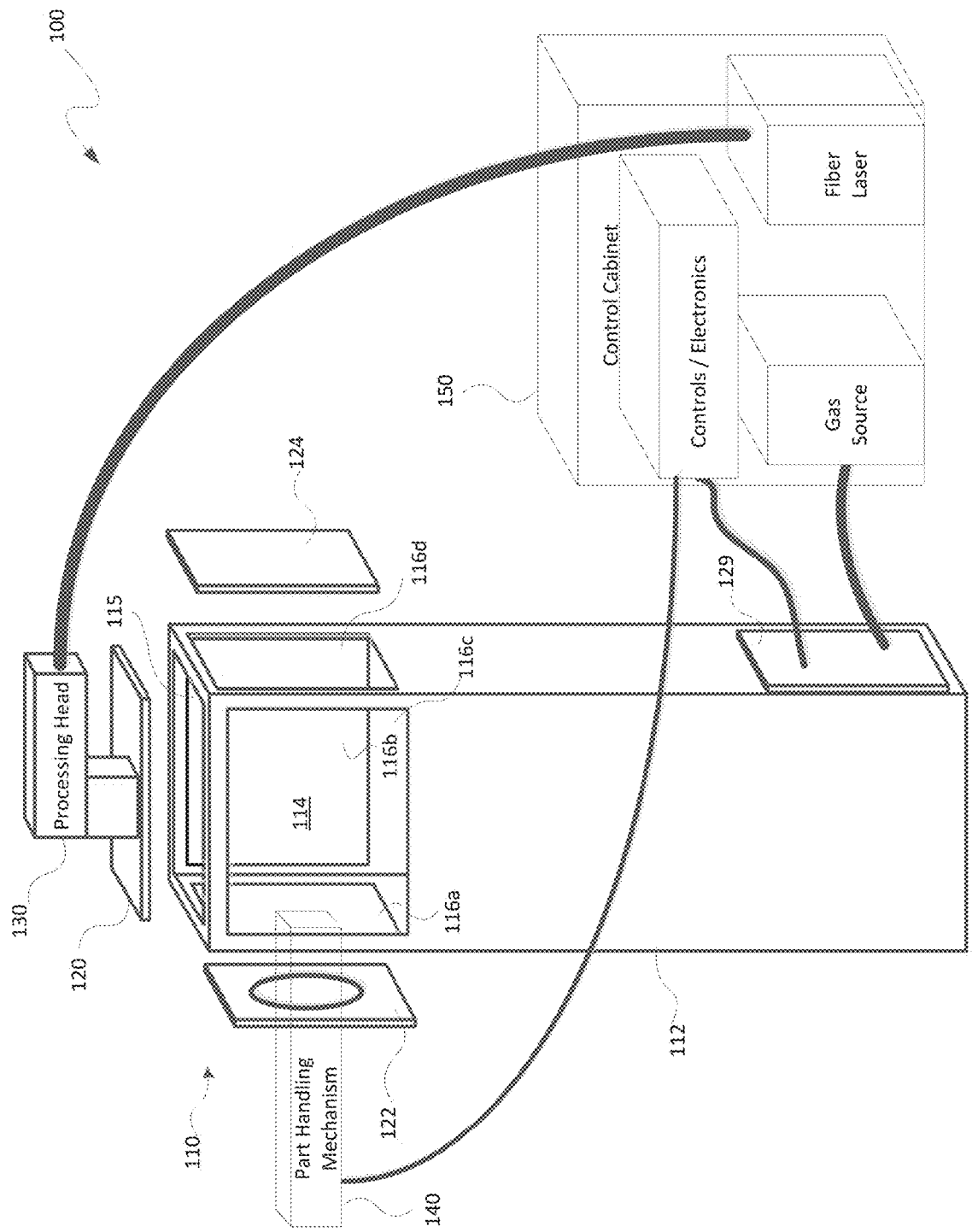
FIG. 1 is a schematic diagram of a modular laser processing system including a modular laser processing enclosure, consistent with embodiments of the present disclosure.

Referring to FIG. 1, an embodiment of a modular laser processing system 100 generally includes a modular laser processing enclosure 110, a laser processing head 130 mounted to the laser processing enclosure 110, and a part handling mechanism 140 mounted to the laser processing enclosure 110. The laser processing enclosure 110 includes an enclosure housing 112 defining a laser processing area 114 with multiple laser processing access openings 115, 116a-d for accessing the laser processing area 114. A top laser processing access opening 115 is located at a top of the enclosure housing 112 and one or more side laser processing access openings 116a-d are located on one or more sides of the enclosure housing 112.

Although four side access openings 116a-d are shown, the enclosure housing 112 may include less than four side access openings. The enclosure housing 112 may include, for example, only two opposing openings 116a, 116d or only two adjacent openings 116a, 116b. The enclosure housing 112 may also include additional openings on one or more sides. In the illustrated embodiment, the enclosure housing 112 is configured as a tower with a rectangular shape such that the side access openings 116a-d are located near the top and on each of the four sides. Each of the sides of the enclosure housing 112 may have the same width such that the enclosure housing 112 has a square cross section and each of the laser processing access openings 115, 116a-d may have substantially the same dimension.

The modular laser enclosure 110 also includes panels or plates 120, 122, 124 for covering one or more of the laser processing access openings 115, 116a-d. The plates 120, 122, 124 may have substantially the same size such that the plates are configured to cover any one of the laser processing accessing openings 115, 116a-d. A processing head plate 120, for example, is configured to be mounted to the laser processing head 130. In the illustrated embodiment, the processing head plate 120 is used to mount the processing head 130 to the top laser processing access opening 115, although the processing head plate 120 may be used to mount the processing head 130 to any of the side laser processing access openings 116a-d. A part loading plate 122 may define an opening (e.g., a circular opening is shown) for receiving and/or guiding the part handling mechanism 140 to the laser processing area 114. The part loading plate 122 may also be configured to be mounted to the part handling mechanism 140. A cover plate 124 may also be used to completely cover one or more of the access openings. The cover plate 124 may be opaque or may include a transparent window (not shown) that allows viewing of the laser processing while protecting an observer from the laser.

The modular laser enclosure 110 also includes a laser system connection plate 129 covering a laser system connection opening in the enclosure housing 112. The laser system connection opening and plate 129 is shown located proximate a bottom of the enclosure housing 112 but may also be located in other locations. The laser system connection plate 129 may provide for a connection between laser system equipment (e.g., controls, electronics, power source, gas sources, smoke vacuums) and the laser processing enclosure 110. The laser system connection plate 129 may include, for example, feedthroughs or connectors that connect to cables or conduits. The laser system connection plate 129 may also include holes for accessing cables and equipment located inside the laser enclosure 110. In one example, a light (e.g., an LED) may be provided inside the laser enclosure housing 112 via the laser system connection plate 129.

A control cabinet 150 may be used to house other components of the laser processing system, such as the fiber laser, gas sources (e.g., process gas and/or shielding gas), vacuum, controls, and other electronics. The fiber laser may provide a wavelength and power depending upon the application and may include fiber laser sources available from IPG Photonics Corporation. One example of the fiber laser may include a quasi-continuous wave (QCW) Ytterbium laser source providing a power between 10 to 1000 W.

The laser processing head 130 may include, without limitation, a laser cutting head, drilling head, welding head or marking head available from IPG Photonics Corporation. The part handling mechanism 140 may include, without limitation, a robotic placement arm, a part conveyor, and a part holder or stage. The modular laser processing enclosure 110 may thus be configured or reconfigured relatively easily for different types of laser sources, laser processing heads, and part handling mechanisms to be used for a variety of different applications.

Referring to FIGS. 2A-2G, an example embodiment of a modular laser processing enclosure 210 is shown and described in greater detail. In this embodiment, the modular laser processing enclosure 210 includes an enclosure housing 212 and a part handling support 218 mounted together on a base 219. The enclosure housing 212 defines a laser processing area 214, which may have a volume of about 6×6×6 inches. The base 219 may be sufficiently dimensioned to provide stability and may include adjustable feet 217. The part handling support 218 is shorter than the enclosure housing 212 to support a part handling mechanism for access to the laser processing area 214.

Figure 2A:
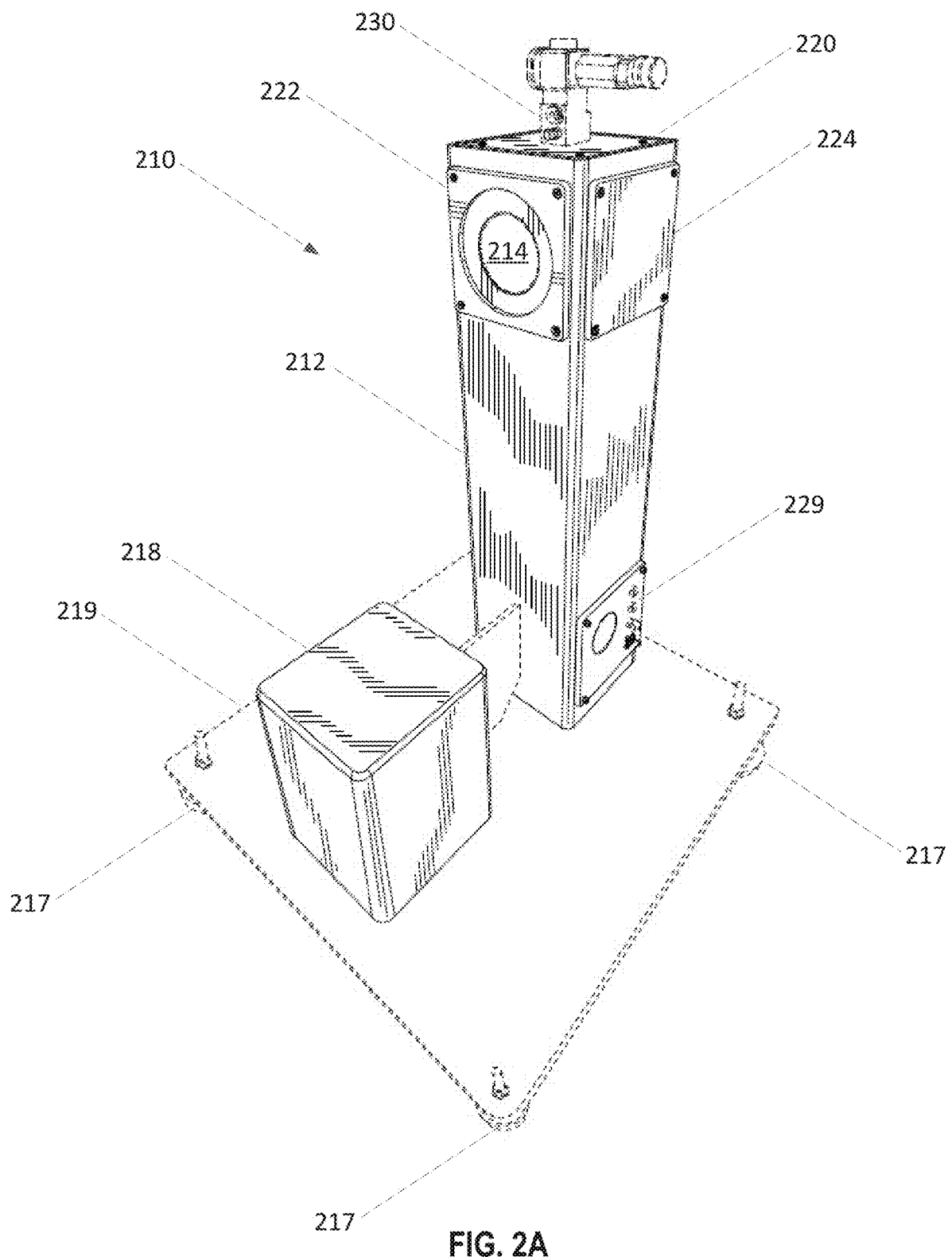
FIG. 2A is a top perspective view of a modular laser processing enclosure for a laser processing system, consistent with an embodiment.
Figure 2B:
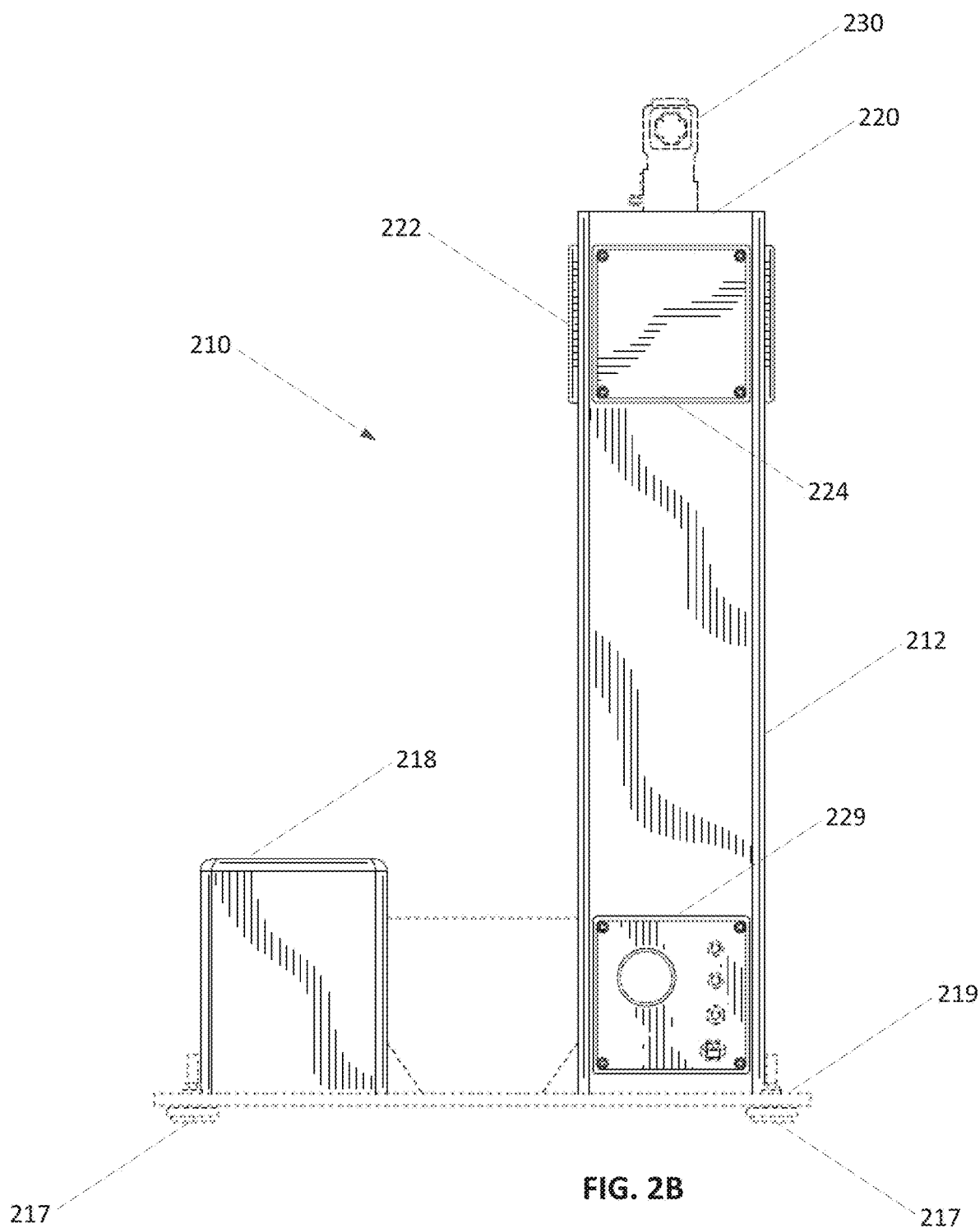
FIG. 2B is a right side view of FIG. 2A.
Figure 2C:
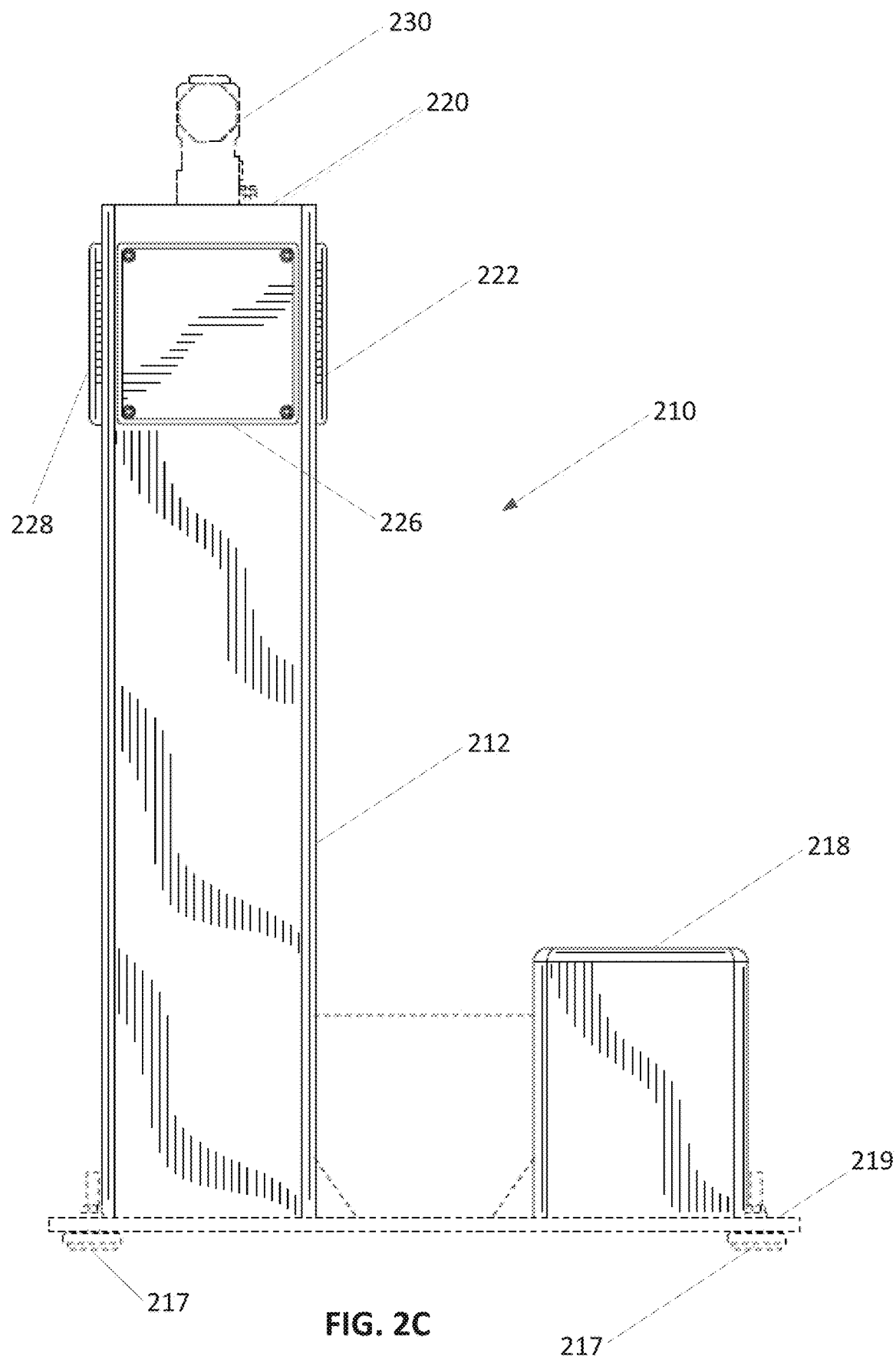
FIG. 2C is a left side view of FIG. 2A.
Figure 2D:
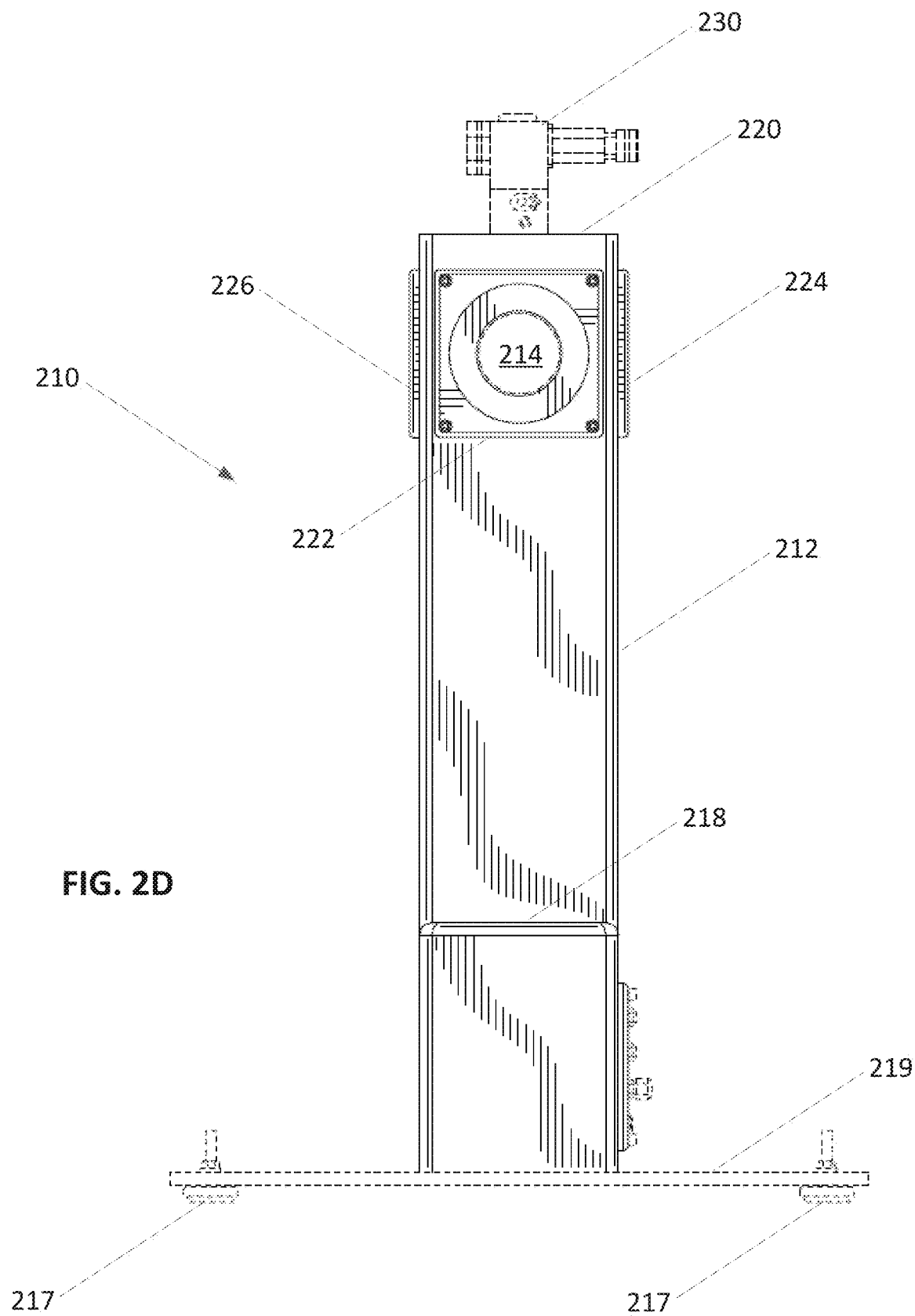
FIG. 2D is a front view of FIG. 2A.
Figure 2E:
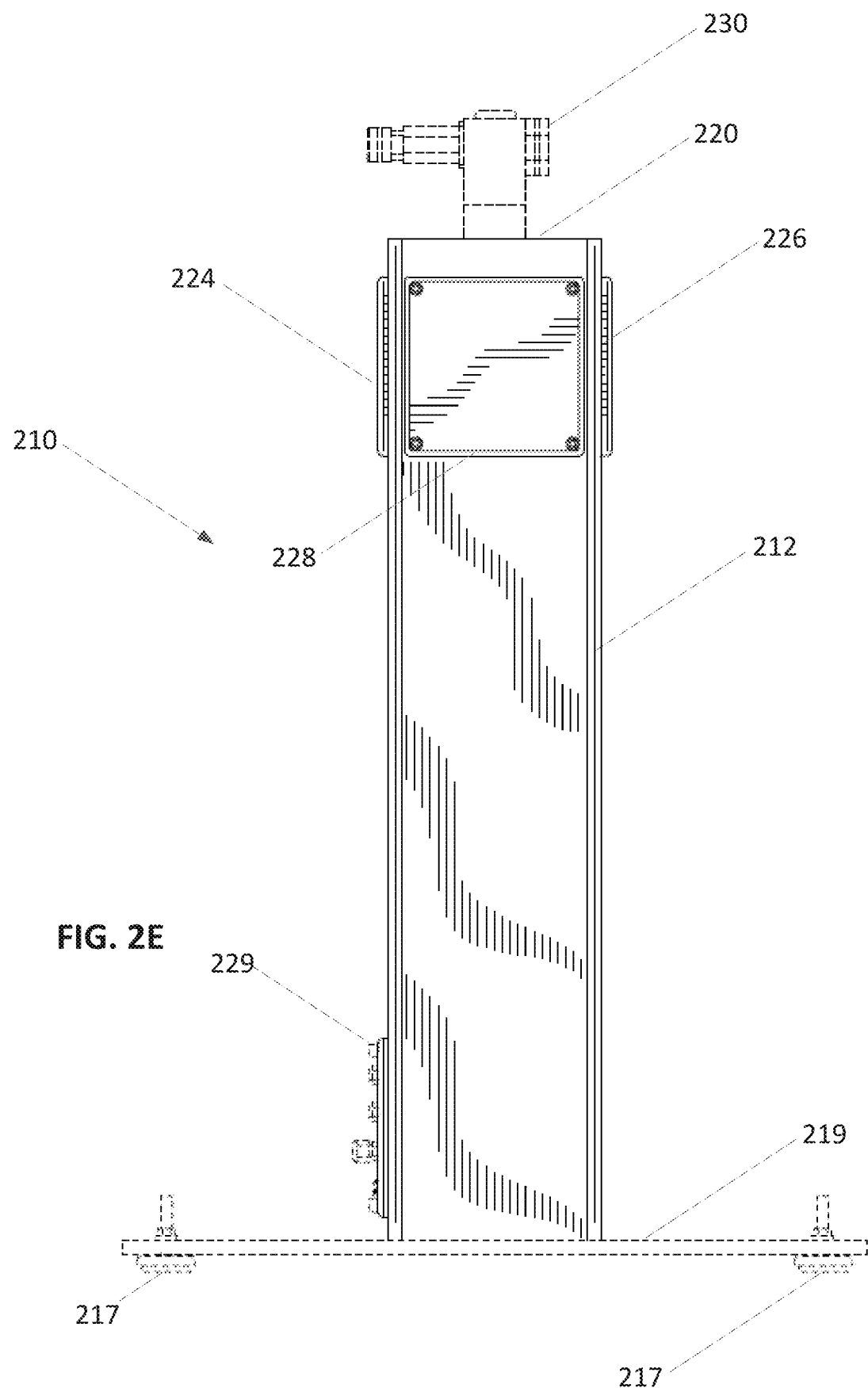
FIG. 2E is a rear view of FIG. 2A.
Figure 2F:
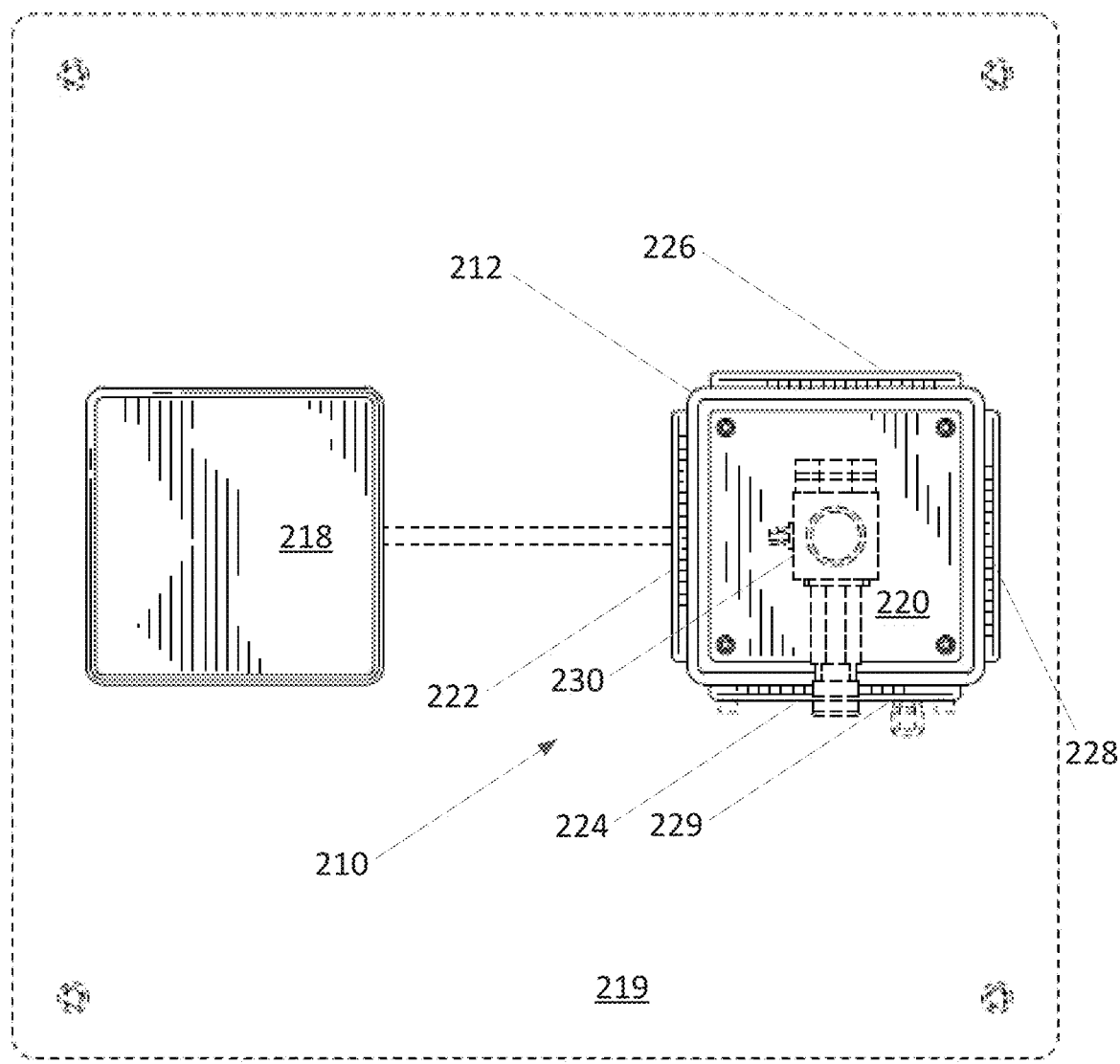
FIG. 2F is a top view of FIG. 2A.
Figure 2G:
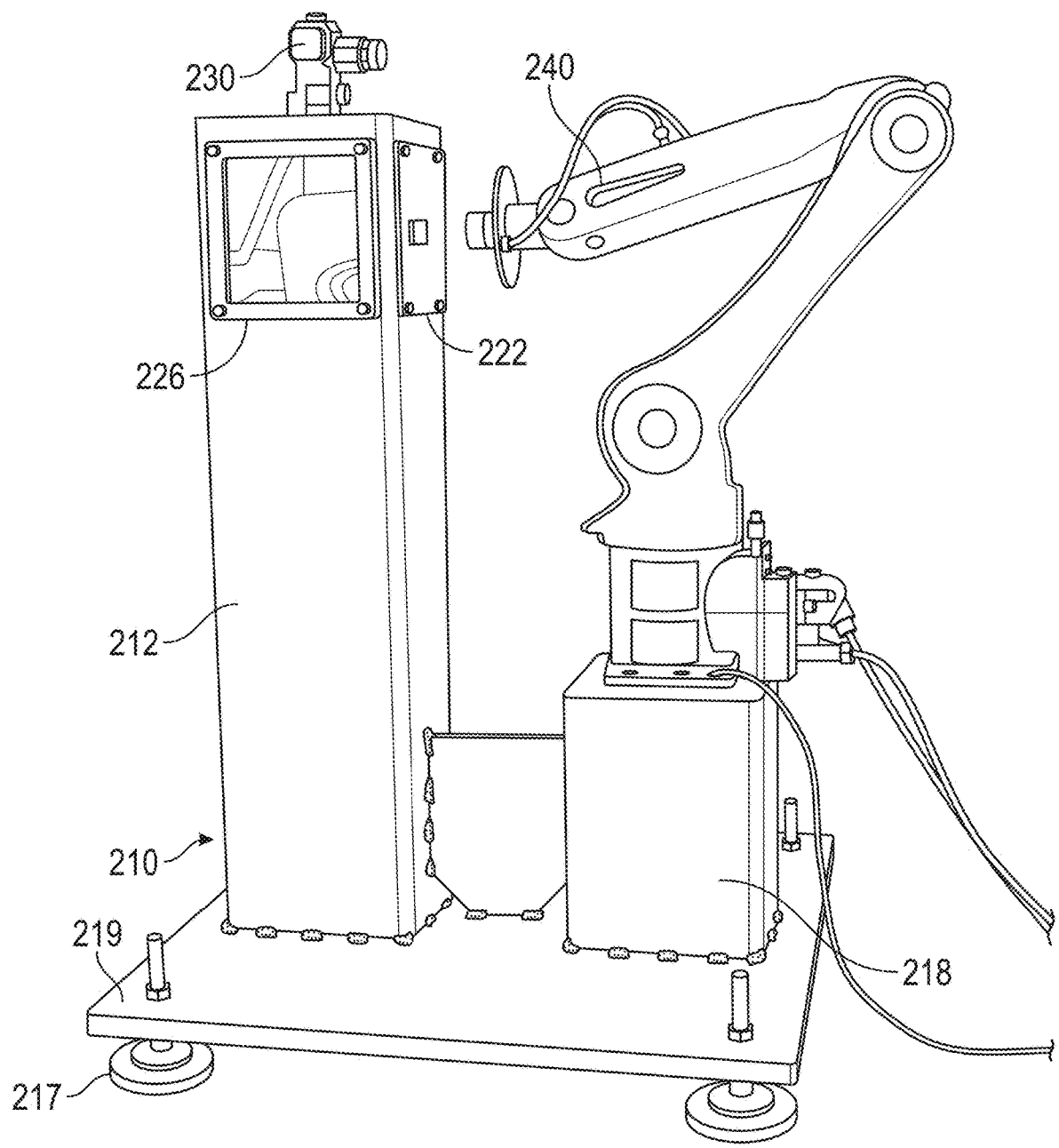
FIG. 2G is a perspective view of the modular laser processing enclosure in FIG. 2A with a robotic placement arm for part handling.

Plates 220, 222, 224, 228 are mounted to the enclosure housing 212 at each of the laser processing access openings. The processing head plate 220 mounts a laser processing head 230 to a top access opening. The part loading plate 222 mounts to a side laser processing access opening and is configured to receive a part for laser processing. As shown in FIG. 2G, a robotic placement arm 240 may be used as a part handling mechanism and may be mounted on the part handling support 218. The robotic placement arm 240 may thus be operated to place parts inside the laser processing area 214 via an opening in the part loading plate 222. Other part handling mechanisms may also be used, such as a part conveyor belt that passes through access openings on opposite sides of the enclosure housing 210.

FIGS. 3-5 show embodiments of different types of plates in greater detail. As shown, each of the plates 220, 222, 224, 228, 229 may be mounted to the enclosure housing 212 with threaded fasteners 225 at the corners of the plates. The processing head plate 220 is also mounted to the laser processing head 230. The part loading plate 222 includes a round opening 223 that provides access to the laser processing area 214, for example, to allow the robotic placement arm to place the workpiece within the laser processing area 214 for laser processing. The cover plates 224, 226, 228 completely cover side access openings in the enclosure housing 212. At least one of the cover plates 226 (see FIG. 2G) includes a transparent window for viewing the laser processing area 214. The laser system connection plate 229 is mounted over a connection opening proximate the base of the enclosure housing 212.

Figure 6:
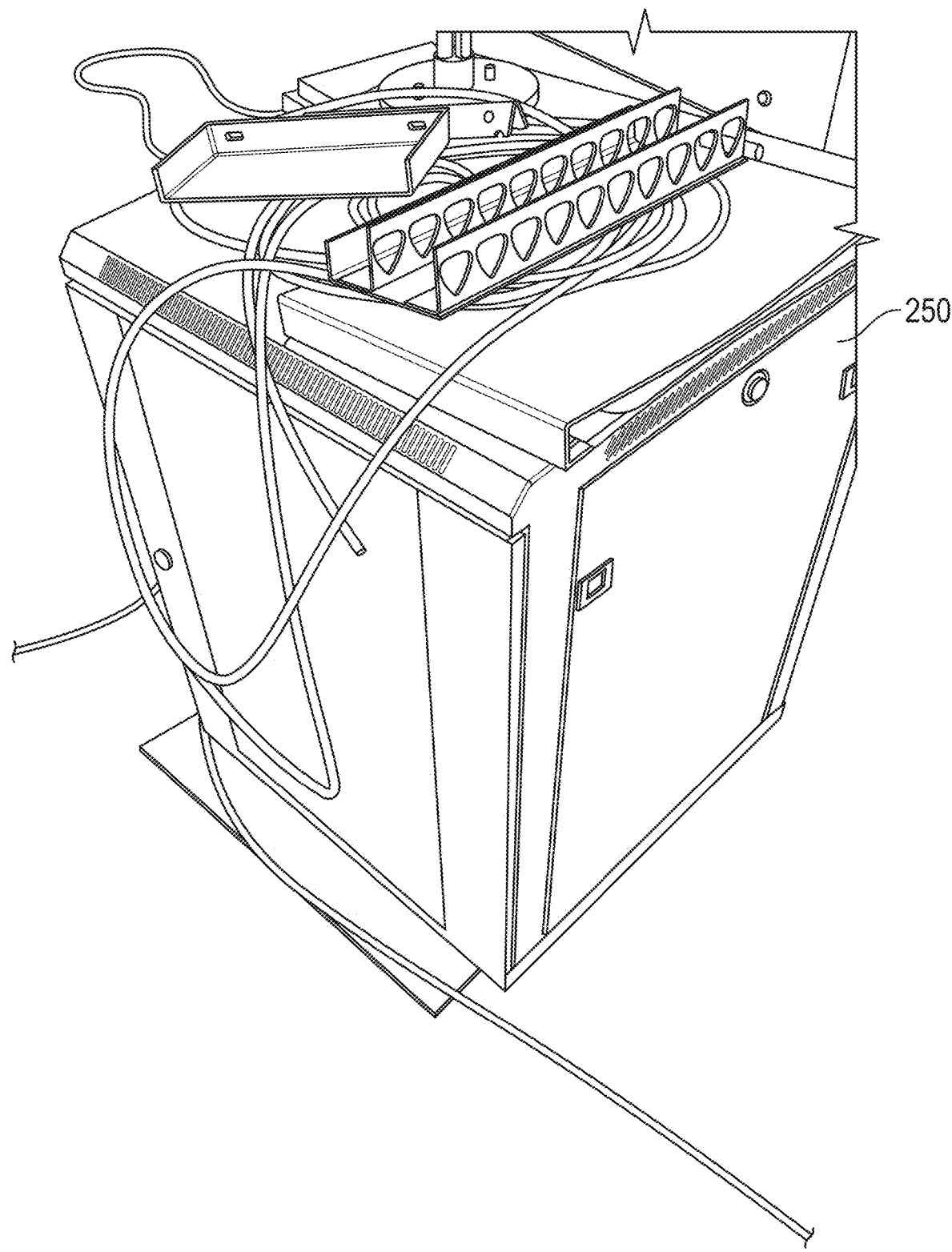
FIG. 6 is a perspective view of a control cabinet for enclosing a fiber laser, controls and other laser system equipment for use with the modular laser processing enclosure shown in FIG. 2.

FIG. 6 shows one example of a control cabinet 250 for housing laser equipment, such as the fiber laser source, the gas source(s), the controllers, and other electronic equipment. The control cabinet 250 may be located near the modular laser processing enclosure 212 and connected via cables and/or conduits.

Figure 7:
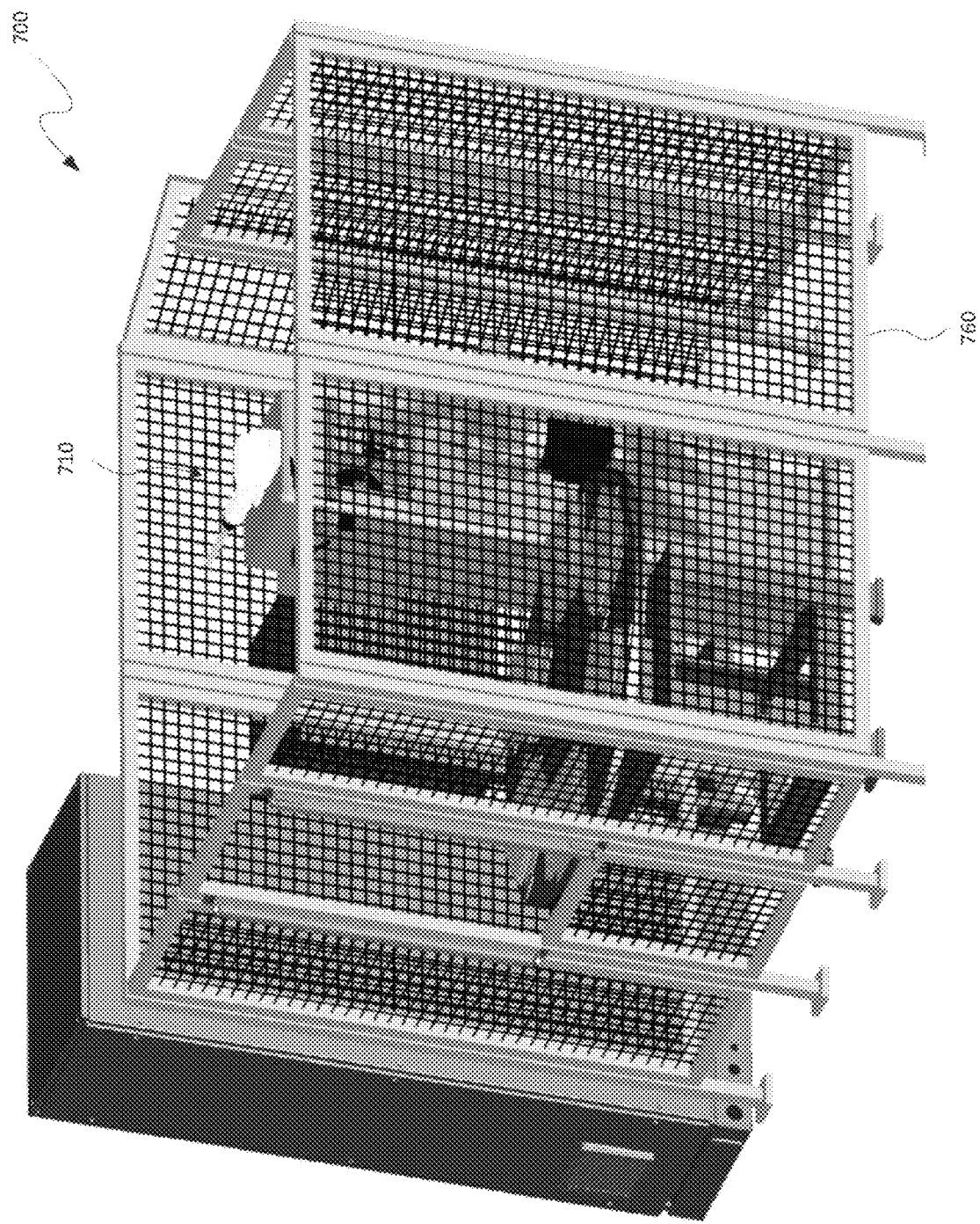
FIG. 7 is a perspective view of one example of a laser processing system including a modular laser processing enclosure surrounded by an external wire mesh enclosure, consistent with an embodiment of the present disclosure.
Figure 8:
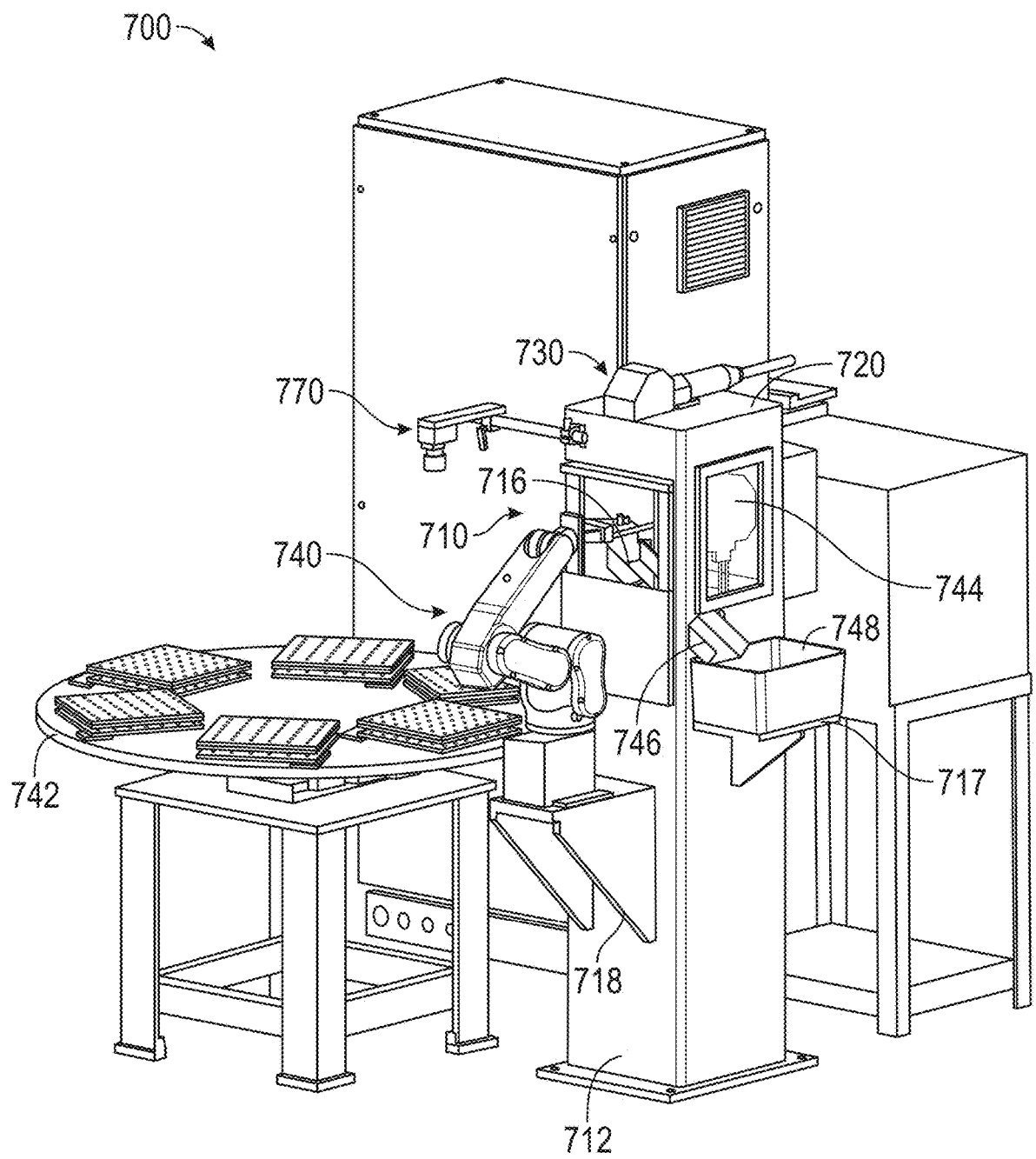
FIG. 8 is a perspective view of the laser processing system in FIG. 7 without the external enclosure.
Figure 9:
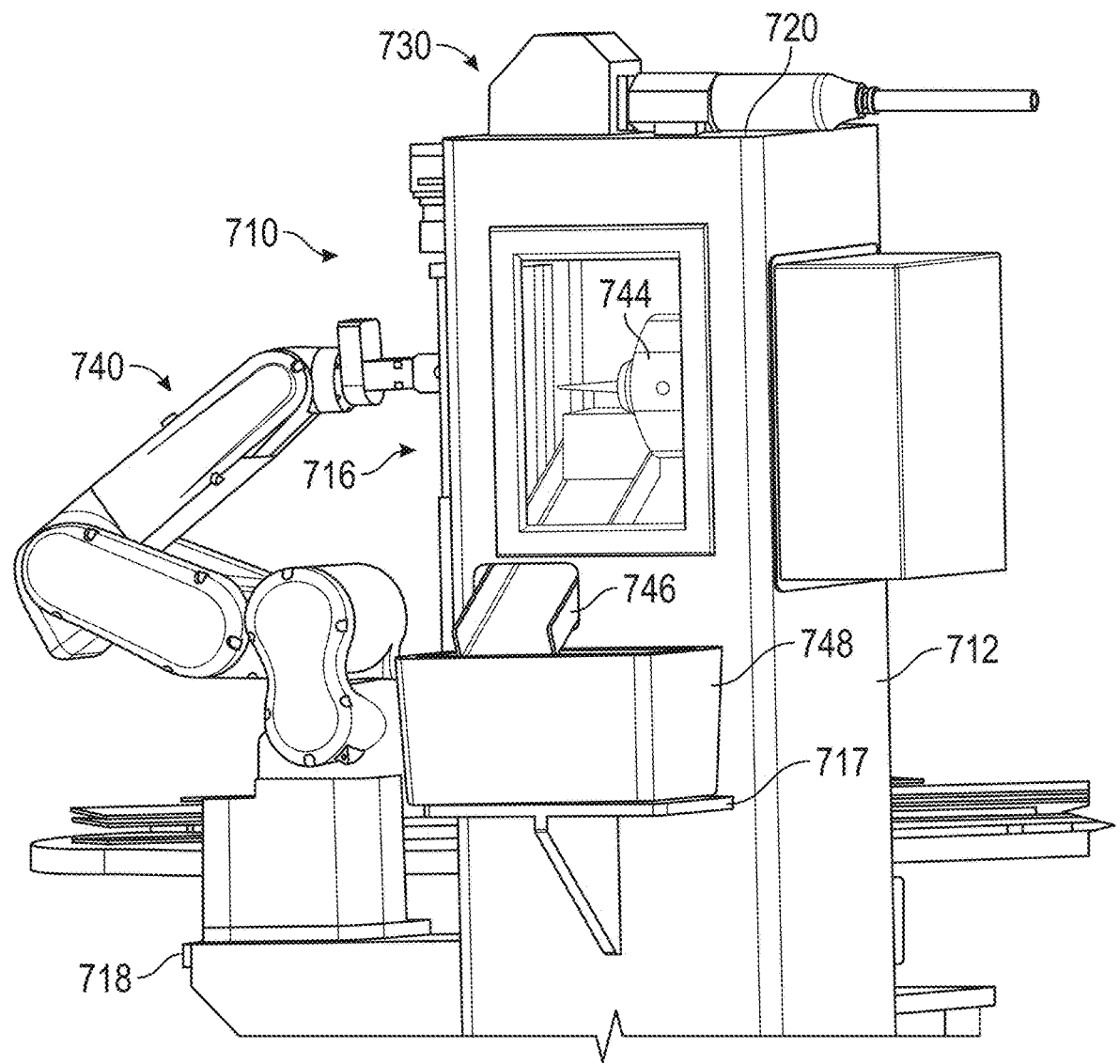
FIG. 9 is a side perspective view of the laser processing system in FIG. 7 showing part handling mechanisms located in laser processing access openings of the modular laser processing enclosure.

Referring to FIGS. 7-9, another example embodiment of a modular laser system 700 is shown. In this embodiment, a modular laser enclosure 710 is surrounded by an external enclosure 760 such as a wire mesh enclosure. As shown in FIGS. 8 and 9, the modular laser enclosure 710 includes an enclosure housing 712 having a rectangular tower configuration with laser access openings 716 on at least three sides and the top of the housing 712. A processing head plate 720 mounts a laser processing head 730 to the top access opening. In this embodiment, part handling supports 718, 717 are mounted on sides of the enclosure housing 712. A camera 770 or other inspection device may also be mounted to the enclosure housing 712.

In this embodiment, a robotic placement arm 740 is mounted on the part handling support 718 and used to obtain the parts from rotary part holding station 742 and to place the parts within the laser processing area through one of the laser processing access openings 716. A rotary stage 744 is mounted within an opposing access opening to receive the parts from the robotic placement arm 740 for processing. A part collection chute 746 receives the processed parts and delivers the processed parts through another access opening to a part collection bin 748 on the part handling support 717. Thus, this embodiment of the modular laser enclosure 710 uses three laser processing access openings for part handling and uses the top access opening for the laser processing head.

Accordingly, a modular laser enclosure, consistent with embodiments described herein, may be used to provide a modular laser system having a variety of configurations for a variety of different applications. The modular laser enclosure thus enables a more versatile and compact Class 1 laser system.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A modular laser system comprising:
   a modular laser processing enclosure including an enclosure housing defining a laser processing area, the enclosure housing including a top and sides, the top of the enclosure housing defining a top laser processing access opening providing access to the laser processing area, at least two of the sides defining side laser processing access openings providing access to the laser processing area, the side laser processing access openings being located proximate the top of the enclosure housing, the enclosure housing further including at least one plate configured to cover any one of the laser processing access openings;
   at least one laser processing head for delivering a laser beam for processing, the laser processing head configured to be mounted to any one of the laser processing access openings; and
   at least one part handling mechanism for delivering parts to and/or from the laser processing area, the part handling mechanism configured to access the laser processing area through any one of the laser processing access openings.

2. The modular laser system of claim 1 further comprising a part handling support coupled to the enclosure housing for supporting the part handling mechanism.

3. The modular laser system of claim 2 wherein the part handling support is coupled to a side of the enclosure housing.

4. The modular laser system of claim 2 wherein enclosure housing includes a base, and wherein the enclosure housing and the part handling support are mounted on the base.

5. The modular laser system of claim 1 wherein four sides of the enclosure housing define side laser processing access openings, respectively, wherein laser processing openings on opposite sides are opposing.

6. The modular laser system of claim 5 wherein the top laser processing access opening and all four side laser processing access openings have substantially the same dimensions.

7. The modular laser system of claim 1 wherein the top laser processing access opening and the at least two side laser processing access openings have substantially the same dimensions.

8. The modular laser system of claim 1 wherein the at least one plate is a processing head plate configured to be mounted to the laser processing head.

9. The modular laser system of claim 1 wherein the at least one plate includes is a part loading plate including an opening for allowing the part handling mechanism to access the laser processing area through the laser processing access opening covered by the part receiving plate.

10. The modular laser system of claim 1 wherein the at least one plate is a cover plate configured to completely cover the laser processing access opening.

11. The modular laser system of claim 1 wherein the enclosure housing defines at least one laser system connection opening below the side laser processing openings to accommodate connections to laser system components, and wherein the enclosure housing includes a laser system connection plate for covering the laser system connection opening and providing connections between the laser system components and the enclosure housing.

12. The modular laser system of claim 1 further including a fiber laser source external to the enclosure housing and configured to be coupled to the laser processing head via an optical fiber.

13. The modular laser system of claim 1 wherein the laser processing head is selected from the group consisting of a cutting head, a marking head, a drilling head, and a welding head.

14. The modular laser system of claim 1 wherein the part handling system is selected from a group consisting of a robotic placement arm, a part conveyor, and a part holding stage.

15. A modular laser system enclosure comprising:
   an enclosure housing defining a laser processing area, the enclosure housing including a top and four sides, the top of the enclosure housing defining a top laser processing access opening providing access to the laser processing area, at least two of the sides defining side laser processing access openings providing access to the laser processing area, the side laser processing access openings being located proximate the top of the enclosure housing; and
   a plurality of plates configured to cover any one of the laser processing access openings, wherein at least one of the plates is a processing head plate configured to be coupled to a laser processing head, wherein at least one of the plates is a part loading plate configured to receive a part handling mechanism, and wherein at least one of the plates is a cover plate configured to completely cover any one of the laser processing access openings.

16. The modular laser system enclosure of claim 15 further comprising a part handling support coupled to the enclosure housing for supporting the part handling mechanism.

17. The modular laser system enclosure of claim 16 wherein the part handling support is coupled to a side of the enclosure housing.

18. The modular laser system enclosure of claim 16 further including a base supporting the enclosure housing and the part handling support.

19. The modular laser system enclosure of claim 15 wherein all of the four sides of the enclosure housing define side laser processing access openings, respectively, wherein laser processing openings on opposite sides are opposing.

20. The modular laser system enclosure of claim 19 wherein the top laser processing access opening and all four side laser processing access openings have substantially the same dimensions.

21. The modular laser system enclosure of claim 15 wherein the top laser processing access opening and the at least two side laser processing access openings have substantially the same dimensions.

22. The modular laser system enclosure of claim 15 wherein the at least two side laser processing access openings are opposing.

23. The modular laser system enclosure of claim 15 wherein the enclosure housing defines at least one laser system connection opening below the side laser processing openings to accommodate connections to laser system components, and wherein the enclosure housing includes laser system connection plate for covering the laser system connection opening and providing connections between the laser system components and the enclosure housing.

* * * * *